Figure 1:
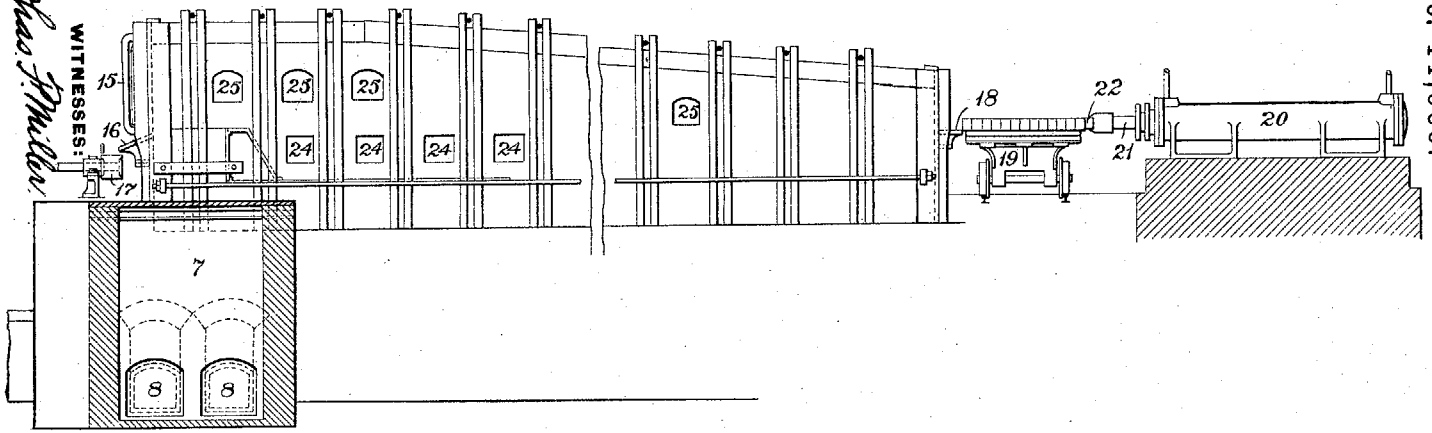

A. LAUGHLIN & J. REULEAUX.

HEATING FURNACE.

No. 11,666. Reissued May 31, 1898.

WITNESSES:
Chas. F. Miller.
R. E. Kaither

INVENTORS,
Alexander Laughlin
Josef Reuleaux
by Darwin S. Wolcott
Att'y.

A. LAUGHLIN & J. REULEAUX.

HEATING FURNACE.

No. 11,666. Reissued May 31, 1898.

WITNESSES:

Chas. F. Miller.

F. E. Gaither

INVENTORS,

Alexander Laughlin and Josef Reuleaux by Damon S. Wolcott Att'y.

A. LAUGHLIN & J. REULEAUX.

HEATING FURNACE.

No. 11,666. Reissued May 31, 1898.

WITNESSES:

Chas. F. Miller.

F. E. Gaither.

INVENTORS,

Alexander Laughlin &

Josef Reuleaux by Dawson & Wolcott Att'y.

A. LAUGHLIN & J. REULEAUX.

HEATING FURNACE.

No. 11,666. Reissued May 31, 1898.

WITNESSES:

Chas. F. Miller.

R. E. Gaither.

INVENTORS,

Alexander Laughlin and

Josef Reuleaux by Damon S. Wolcott Att'y.

A. LAUGHLIN & J. REULEAUX.

HEATING FURNACE.

No. 11,666. Reissued May 31, 1898.

WITNESSES:

Chas. F. Miller.

F. E. Gaither.

INVENTORS,

Alexander Laughlin &

Josef Reuleaux by Dawson & Wolcott Att'y.

A. LAUGHLIN & J. REULEAUX.

HEATING FURNACE.

No. 11,666. Reissued May 31, 1898.

WITNESSES:

Chas. F. Miller

A. E. Gaither.

INVENTORS,

Alexander Laughlin and Josef Reuleaux by Darwin S. Wolcott Att'y.

A. LAUGHLIN & J. REULEAUX.

HEATING FURNACE.

No. 11,666. Reissued May 31, 1898.

WITNESSES:

Chas. F. Miller.

F. E. Gaither

INVENTORS,

Alexander Laughlin

Josef Reuleaux by Darwin S. Wolcott Att'y.

UNITED STATES PATENT OFFICE.

ALEXANDER LAUGHLIN, OF SEWICKLEY, AND JOSEF REULEAUX, OF WILKINSBURG, PENNSYLVANIA; SAID REULEAUX ASSIGNOR TO SAID LAUGHLIN.

HEATING-FURNACE.

SPECIFICATION forming part of Reissued Letters Patent No. 11,666, dated May 31, 1898.

Original No. 582,476, dated May 11, 1897. Application for reissue filed November 19, 1897. Serial No. 659,102.

*To all whom it may concern:*

Be it known that we, ALEXANDER LAUGHLIN, a resident of Sewickley, and JOSEF REULEAUX, a resident of Wilkinsburg, in the county of Allegheny and State of Pennsylvania, citizens of the United States, have invented or discovered certain new and useful Improvements in Heating-Furnaces, of which improvements the following is a specification.

The invention described herein relates to certain improvements in what are known as "continuous-heating" furnaces—*i. e.*, furnaces in which the article is charged into one end thereof and forced through and discharged through the opposite end, being heated during its progress through the furnace. These furnaces are of necessity quite long—*i. e.*, thirty or forty feet—and are heated by the combustion of gas or the flame and products of combustion of solid fuel, the heating medium being admitted to the discharge end of the furnace. It is necessary for efficient heating that a long flame approximately equal to the length of the furnace should be produced. This is usually effected by increasing the draft of the stack at the front end of the furnace. When side inlet-flues are employed in connection with an increased draft, the middle portions of the furnace near the rear or discharge end are not efficiently heated, as the flame is drawn away from such middle portion by the increased draft, as the two lines or streams of flame are drawn at a sharp angle to the direction of the flow of the gas and air from the ports and only unite at a considerable distance from the rear end of the furnace. Gas and air have also been admitted through the roof of the furnace, the design being to project the flame down onto the articles passing through the furnace. This method is objectionable for the reason that the heating is, as it were, localized, the flames having a blowpipe action, thereby injuriously heating the articles.

For the purpose of annealing, furnaces have been constructed with a long chamber through which articles can be moved continuously. These furnaces have been constructed with inlet-flues arranged transversely of the heating-chamber, so that articles will pass over these flues in their movement through the chamber. These flues are located either at the entrance end of the chamber or about midway of its length or between these two points. It results from such a construction that the articles as they move slowly through the furnace are highly heated before they reach the middle of the furnace and are cold when they are discharged. Such construction is inapplicable to heating billets, which should be discharged when heated to the highest degree.

The object of the present invention is to provide for the introduction of the gas and air or products of combustion from the solid fuel into the furnace below the line of travel or movement of the article to be heated and for the quick discharge of the billets after reaching the point of highest heat; and in general terms the invention consists in the construction and combination substantially as hereinafter more fully described and claimed.

Figure 2:
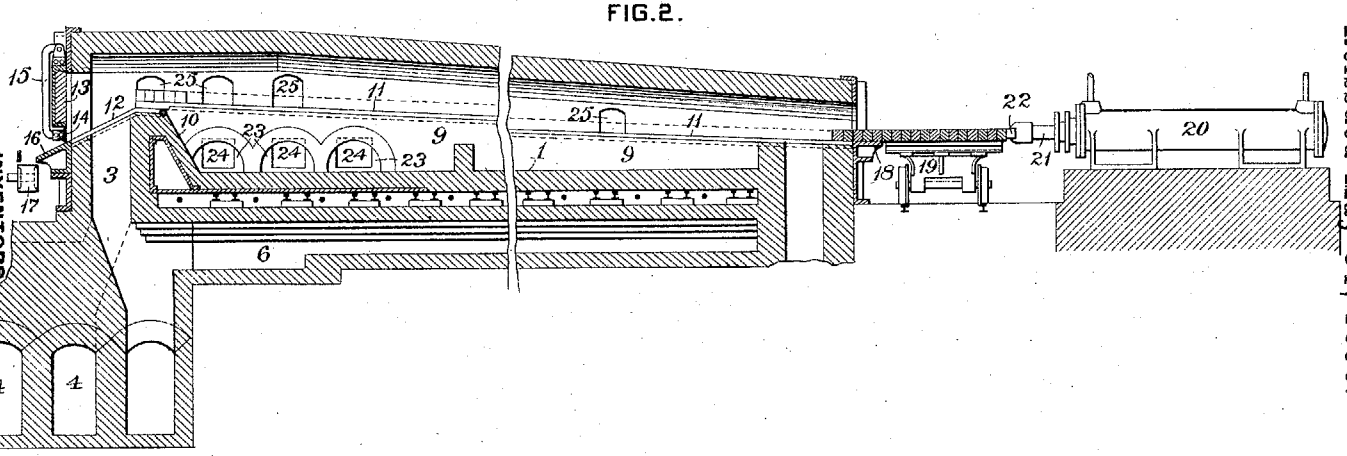
Figure 3:
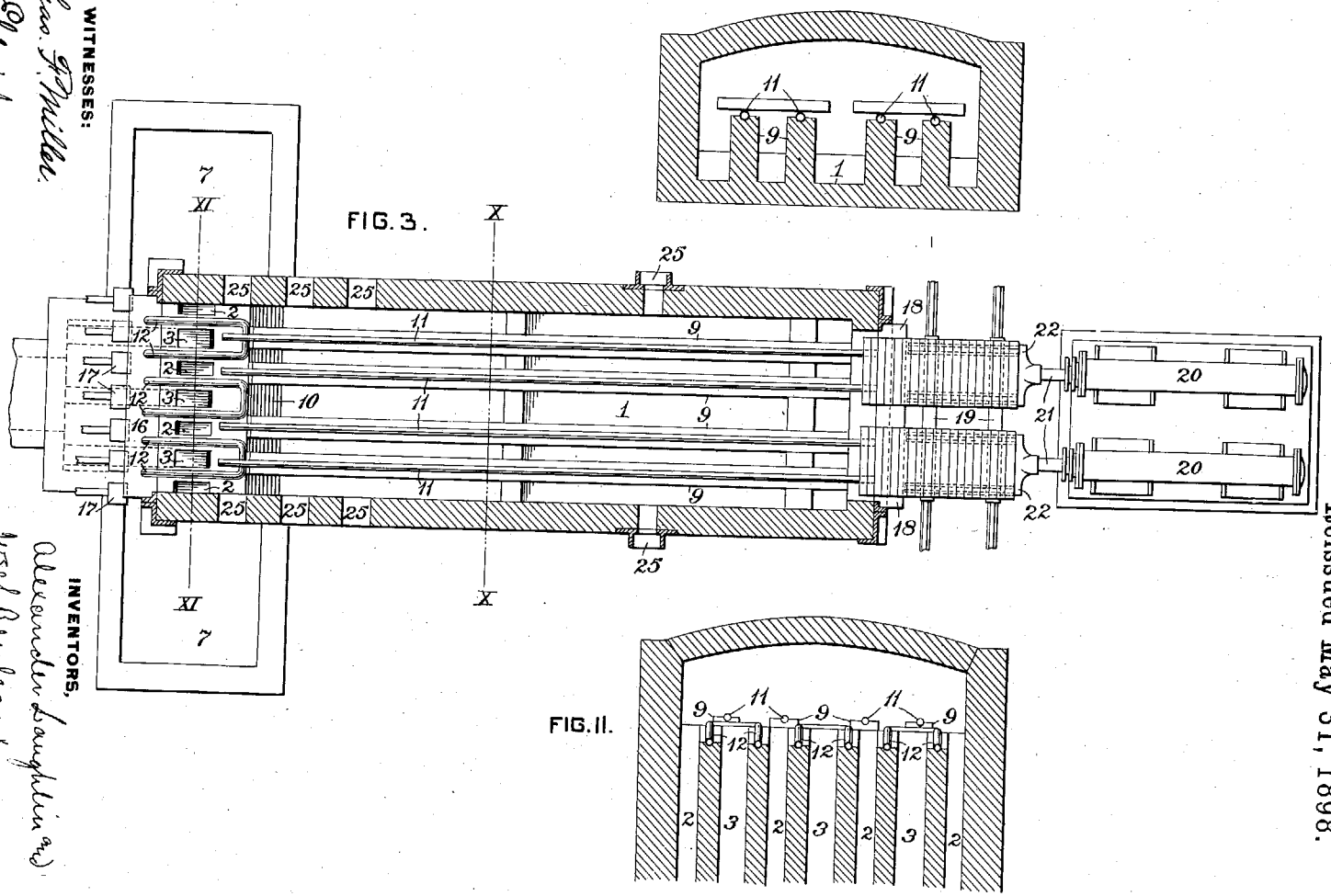
Figure 4:
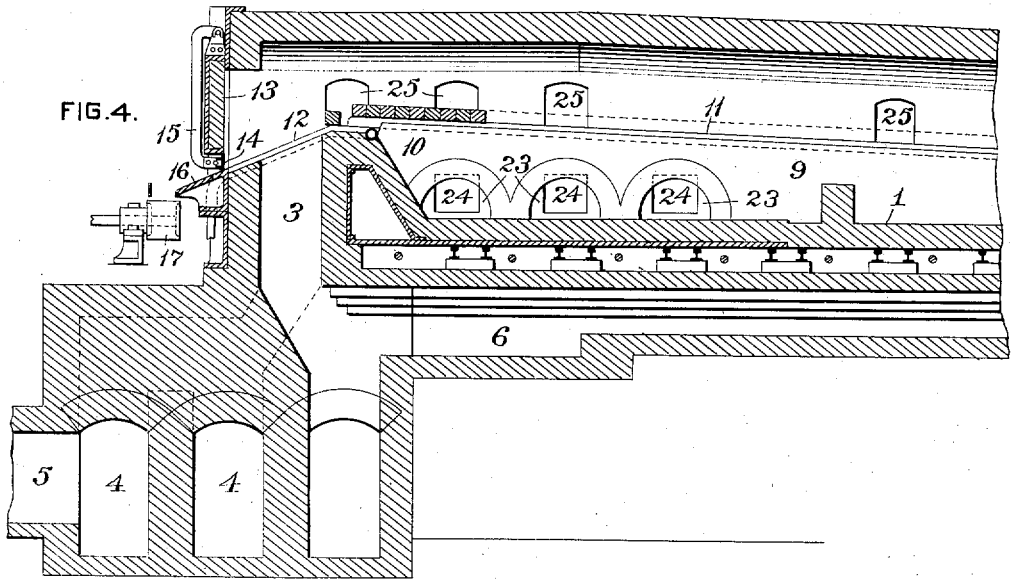
Figure 5:
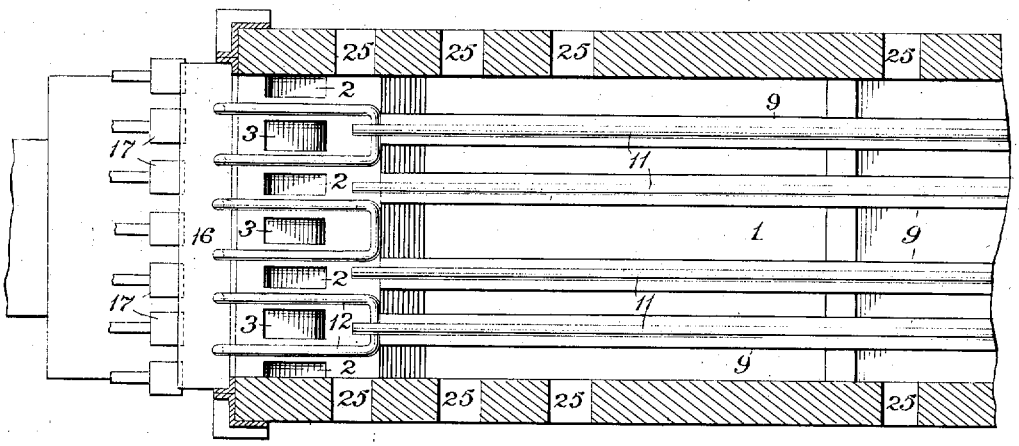
Figure 12:
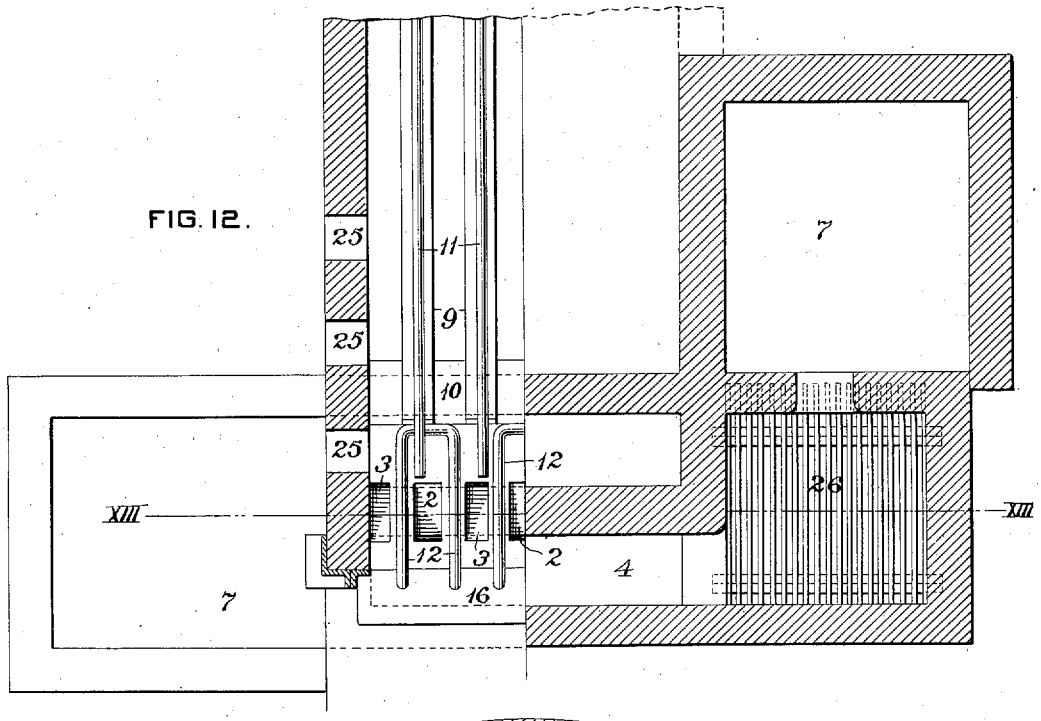
Figure 13:
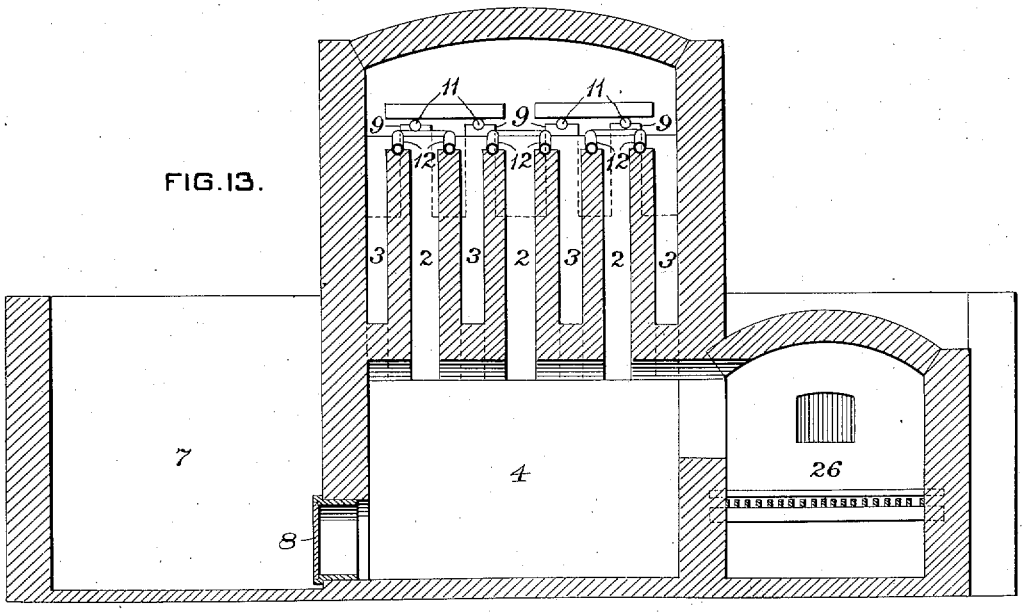
Figure 14:
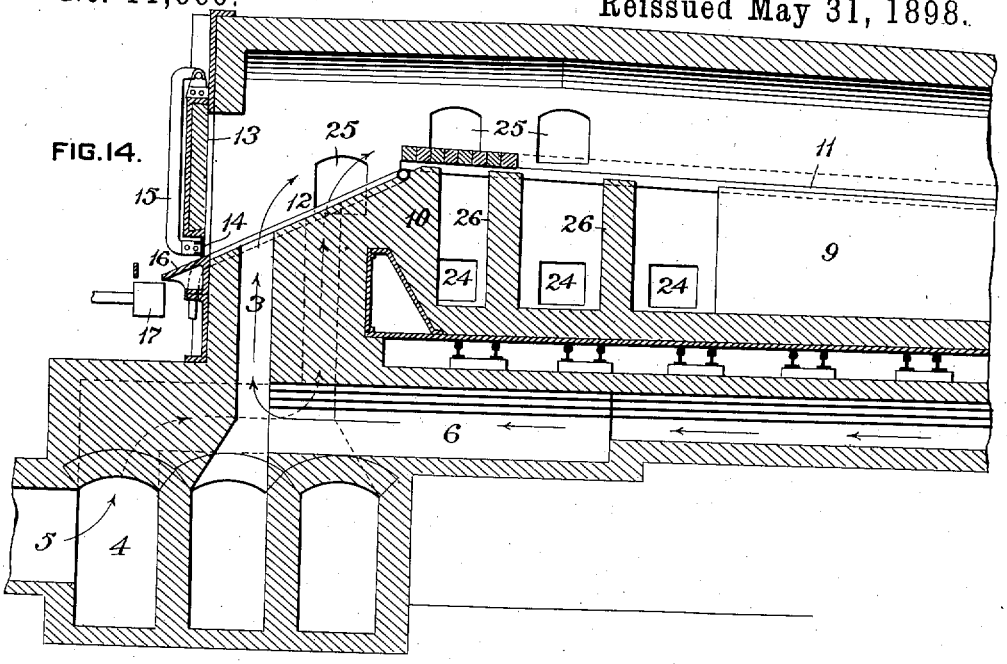
Figure 15:
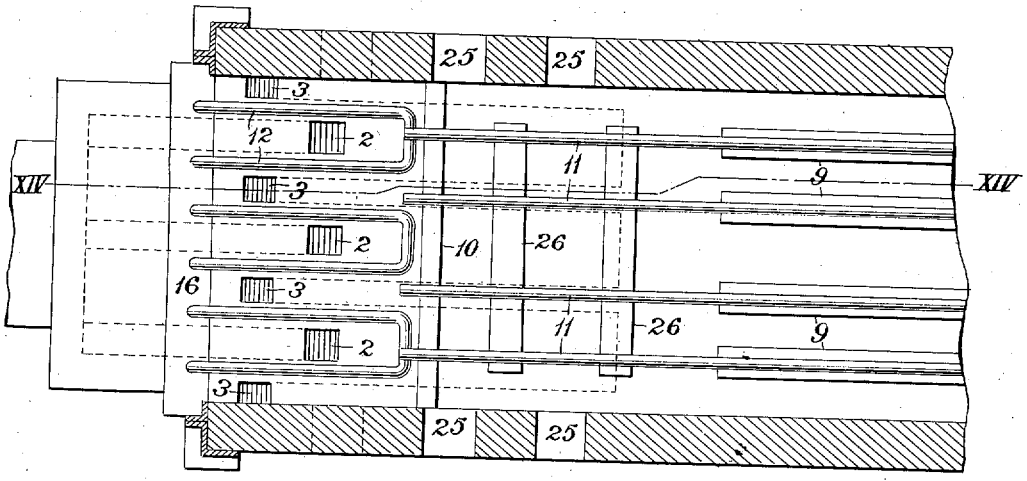

In the accompanying drawings, forming a part of this specification, Figure 1 is a side elevation of our improved furnace. Fig. 2 is a longitudinal vertical section of the same; Fig. 3, a sectional plan view. Figs. 4 and 5 are a sectional elevation and plan, respectively, illustrating certain modifications in the supports for the articles to be heated. Figs. 6, 7, 8, and 9 are views similar to Figs. 4 and 5 of further modifications of the supports for the articles to be heated. Figs. 10 and 11 are vertical transverse sections, the planes of section being indicated by line X X XI XI, Fig. 3. Fig 12 is a sectional plan view of our improved furnace, showing the arrangement of the combustion and heating chambers when employing solid fuel. Fig. 13 is a sectional elevation, the plane of section being indicated by line XIII XIII, Fig. 12. Fig. 14 is a longitudinal vertical section on the line XIV XIV, Fig. 15; and Fig. 15 is a sectional plan view, said view illustrating certain modifications in the manner of supports for the rails or pipes on which the billets rest in their passage through the furnace.

In the practice of our invention the furnace is constructed, as regards the exterior walls and the bed 1 thereof, in the usual or any suitable manner. Along the rear end of the furnace are arranged the gas and air ports or flues 2 and 3, said ports or flues extending transversely and across the furnace in proximity to the rear wall thereof. The gas-ports connect at their lower ends with a transverse conduit 4, which in turn connects with a supply-conduit 5. The air ports or flues 3 are connected with a horizontal conduit 6, through which air is conducted to said ports. The flues or ports 2 and 3 are extended below their points of connection with the air and gas supply conduits, such extensions communicating with pockets 7 for the reception of slag or other material which would be liable to choke up the gas and air flues, said pockets being provided with doors 8, through which slag or other dirt can be removed from the pockets.

On the bed 1 of the heating-chamber are formed two or more lines of supports or piers 9, extending longitudinally through the furnace from the front toward the rear end thereof, preferably terminating in front of the bridge-wall 10. It is preferred to arrange on these continuous piers a hard wearing-surface 11 in the form of a rail or tube, preferably the latter, through which water is caused to circulate to prevent injury by the heating of the furnace. These wearing-surfaces or tubes preferably extend to the rear edge of the bridge-wall, as shown in Figs. 2 and 3.

Provision is made for the automatic movement of the articles being heated from the main supports 11 to the end discharge-opening and preferably across the flues 2 and 3. This automatic movement is preferably effected by means of a series of inclined supplemental supports or bridge-pieces 12, which are preferably formed in pairs by bending a suitable length of pipe into U shape. The front ends of these pipes are supported upon the bridge-wall and extend from thence along the tops of the walls separating the gas and air flues and have their rear portions supported by the rear wall of the furnace at and adjacent to the lower edge of the discharge-opening.

It is preferred to support the rear ends of the wearing-surfaces or tubes 11 at a higher level than the front ends of the bridge-tubes 12, so that when an article or billet is pushed off of the end of the tubes 11 it will drop onto the bridge-tubes with a rotating motion, as will be readily understood by reference to Fig. 2, and slide quickly over the gas and air flues 2 and 3.

When tubes are employed for the wearing-faces 11 and the bridge-pieces 12, the outer ends are suitably connected to supply and discharge pipes, so as to insure a circulation of water or other cooling fluid therethrough in any suitable manner known in the art. The upper portion of the opening at the rear end of the furnace is closed by main door 13, adapted to be raised and lowered in any of the ways known in the art, while the lower portion of the opening is closed by an auxiliary door 14, having attached thereto an arm 15, which has its upper end pivotally supported or hinged on the main door. This construction permits of the auxiliary door being forced outward by a billet sliding down the bridge-pieces, thereby permitting of its passage onto the fore-plate 16, by which it is guided onto suitable feed-rolls 17.

At the front end of the furnace is secured a shelf or ledge 18, having its upper surface in line with the upper surface of the wearing-faces or tubes 11 and adapted to receive the billets or other articles to be heated from the bed of the truck 19, which moves on rails transverse of the furnace and between it and the pushing mechanism. The pushing mechanism preferably consists of a cylinder 20, having the outer end of its piston-rod 21 suitably shaped or provided with a head 22, adapted to take an even bearing against the side of an article which it is desired to force from the bed of the truck into the furnace.

In order to provide for the removal of slag, &c., from the bed of the heating-chamber, a series of openings 23 are formed through the continuous piers, and suitable doors 24 are arranged in the side walls of the furnace in line with said openings through the piers.

In order to permit of the inspection of the billets or other articles during their passage through the furnace and also of the intermediate charging of such articles into the furnace, a series of doors 25 are formed in the side walls, as shown in Fig. 2.

It may sometimes occur in the heating of billets that the portions of the under surfaces in contact with the bearing-faces or tubes 11 will not be properly heated on account of their protection by such tubes or surfaces. In order to heat such cool portions, the bridge-pieces 12 may be arranged out of line with the tubes or bearing-faces 11, as shown in Figs. 3, 5, 9, and 12, so that the surfaces of the billet which were formerly in contact with the tubes 11 will be exposed to the direct action of the heat while passing along the bridge-pieces.

Figure 6:
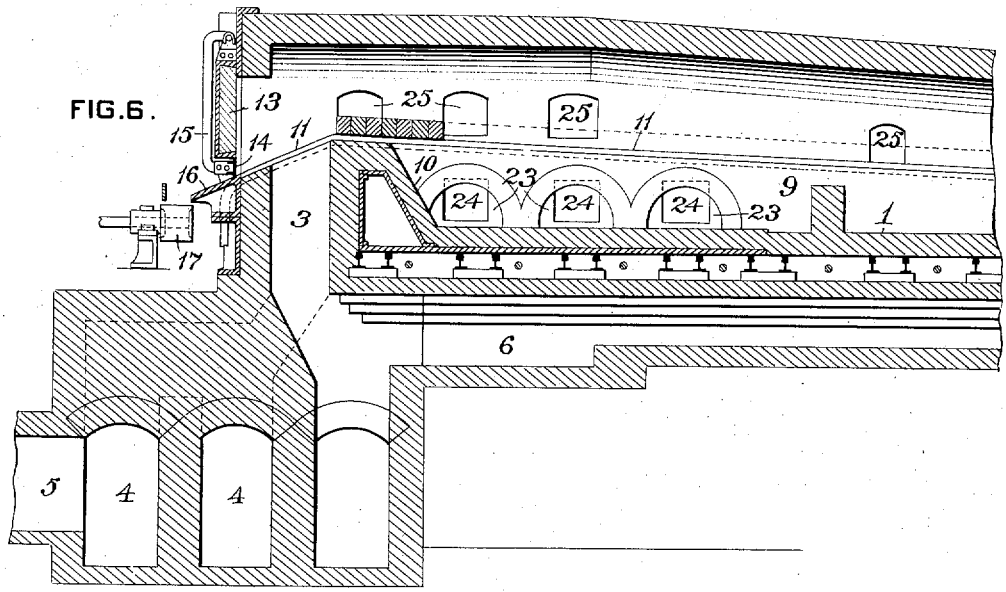
Figure 7:
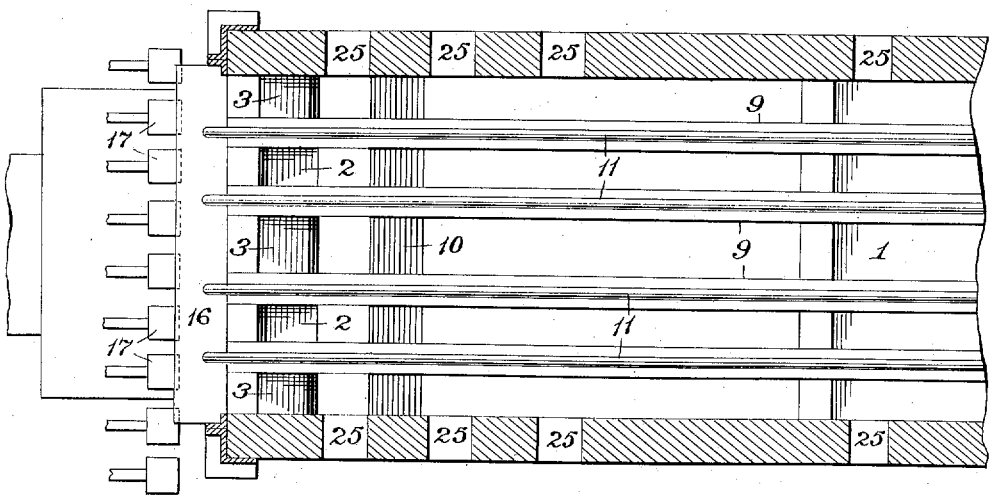
Figure 8:
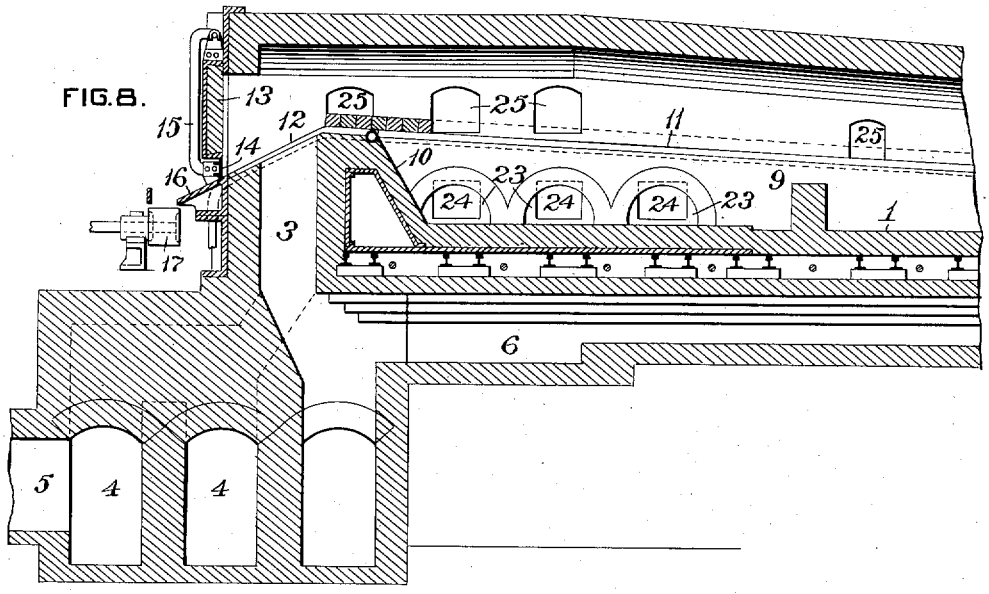
Figure 9:
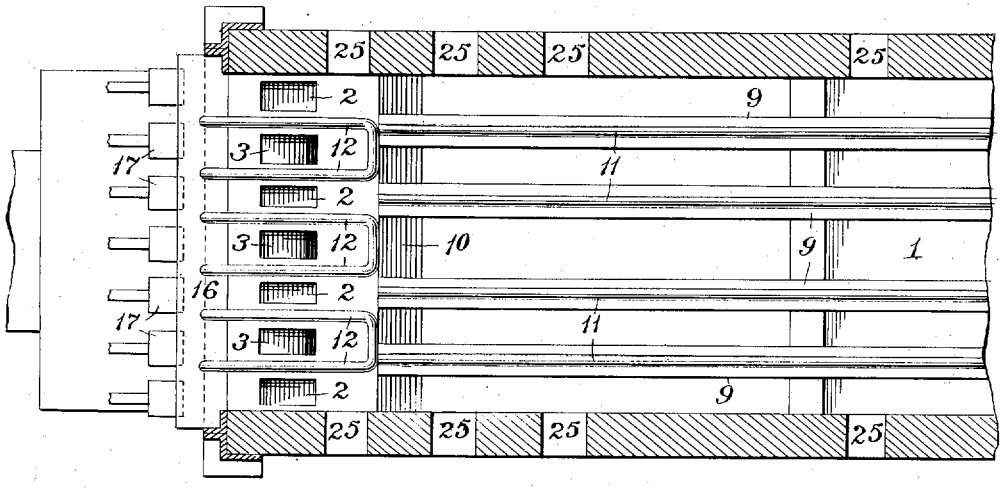

It is preferred, as hereinbefore stated, to arrange the ends of the tubes 11 and the surfaces of the bridge-pieces 12 on different levels, as shown in Figs. 2 and 4, so that in case of two billets becoming stuck together while passing through the furnace the rotary movement imparted to a billet as it drops off of the tubes 11 will tear the billets apart. We do not wish to limit ourselves, however, to the arrangement shown in Figs. 2 and 4, as the bridge-pieces may have their front ends on the same level as the rear ends of the tubes 11, as shown in Figs. 6 and 8, and, further, we do not wish to limit ourselves to the employment of bridge-pieces independent of the tubes 11, as the latter may be extended, as shown in Figs. 6 and 7, across the flues 2 and 3, such extensions forming the bridge-pieces. As shown in Figs. 4 and 5, the drop or shoulder for insuring the separation of billets, as hereinbefore described, may be so located that the billet will drop onto a horizontal portion of the bridge-pieces, from which position it can be drawn by a hook; but it is preferred to so arrange the shoulder or drop that the billet will fall onto the inclined portions of the bridge-pieces and slide or roll along the same onto the feed-rolls, as shown in Fig. 2.

In Figs. 12 and 13 we have shown an arrangement of fire-chamber 26 for the combustion of solid fuel in such relation to the conduit 4 that the flame and products of combustion will pass into such conduit and thence up the flues or ports 2.

Where the piers 9 are made practically continuous to the bridge 10, as shown in Figs. 1 to 13, inclusive, the operation of the furnace is rendered difficult from the accumulation of slag and cinder on the piers. These accumulations prevent the easy movement of the billets and also force them up toward the roof. The slag and cinder running down the sides of the piers cut them away, rendering renewal of portions of the piers necessary, and such repairs are especially difficult when the inner piers are cut away. In order to avoid these difficulties, the piers 9 extend from the rear to a point where the heat will be sufficient to melt the slag and cinder. From this point the tubes 11 are supported by one or more comparatively narrow transverse piers 26, as shown in Figs. 14 and 15. In such a construction any slag which drops from the billets will be caught by the pocket in the rear of the piers 9, and such slag as may lodge on the piers will be pushed off by succeeding billets or can be removed by tools inserted through side doors, from which all parts of the pockets and piers 26 are readily accessible not only for the removal of the slag, but also for inspection and repair.

It is characteristic of our improved furnace that combustion occurs in the line of movement of the billets through the furnace and the flame and products of combustion are maintained in such line during their flow through the furnace. It will be observed that the billets or other articles are subjected to the greatest heat just prior to their discharge from the furnace, and the heat is of such character as will not injuriously affect the billets.

We claim herein as our invention—

1. A continuous-heating furnace provided with receiving and discharge openings at or near the ends of the furnace, supports extending from the receiving to the discharge opening, mechanism for pushing the billets along the supports to or adjacent to the fuel-ports or point of highest heat, and means independent of the pushing mechanism for more quickly moving the billets past said fuel-ports or point of highest heat and out of the furnace, substantially as set forth.

2. A continuous-heating furnace provided with receiving and discharge openings at or near the ends of the furnace, supports extending from the receiving to the discharge opening, mechanism for pushing the billets along the supports to or adjacent to the fuel-ports or point of highest heat, and means independent of the pushing mechanism for effecting a quicker automatic movement of the billets past said fuel-ports or point of highest heat and out of the furnace, substantially as set forth.

3. A continuous-heating furnace provided with receiving and discharge openings at or near the ends of the furnace, supports extending from the receiving to the discharge opening, the supports adjacent to the discharge-opening being inclined to cause the automatic movement of the billets past the fuel-ports or point of highest heat through the discharge-opening and mechanism for pushing the billets along the supports to the point of automatic discharge, substantially as set forth.

4. A continuous-heating furnace provided at its opposite end walls with receiving and discharge openings, and having in combination a series of flues or ports through which the combustibles enter the heating-chamber, arranged adjacent to the rear or discharge opening of the furnace and transversely thereto, supports for the articles to be heated extending from the receiving-opening to points adjacent to the flues, mechanism for pushing the articles along the supports, and bridge-pieces adapted to receive the article from said supports and support it while passing over the flues to the discharge-opening, said bridge-pieces being sufficiently inclined to cause the automatic movement of the article over the flues and through the discharge-opening, substantially as set forth.

5. A continuous-heating furnace, having in combination a series of flues or ports through which the combustibles enter the heating-chamber adjacent to the rear or discharge end of the furnace, supports for the article to be heated, extending from the front end to points adjacent to the rear end of the furnace, and supplemental supports arranged parallel, or approximately parallel, with the main supports, but in different planes, and extending from the rear ends of the main supports over the flues, substantially as set forth.

6. A continuous-heating furnace having in combination a series of flues or ports through which the combustibles enter the heating-chamber arranged adjacent to the rear or discharge end of the furnace, supports for the article to be heated, extending from the front end to points adjacent to the rear end, supplemental supports extending from the main supports to and over the flues at the rear end of the furnace, the rear ends of the main supports being raised above the adjacent parts of the supplemental supports, thereby forming a drop for the article being heated, substantially as set forth.

7. A continuous-heating furnace having in combination a series of flues or ports through which the combustibles enter the heating-chamber arranged adjacent to the rear or discharge end of the furnace and transversely thereof, supports extending from the front end of the furnace to points adjacent to said flues, and supplemental supports or bridge-pieces extending from the main supports over the flues, said supplemental supports being inclined, substantially as set forth.

8. A continuous-heating furnace having in combination continuous piers or supporting-walls extending longitudinally from the front toward the rear end of the furnace, one or more piers arranged transversely of the furnace between the bridge-wall and the ends of the longitudinal piers, and bearing-pieces or supports for the billets, &c., arranged on the longitudinal and transverse piers, substantially as set forth.

9. The combination of a continuous-heating furnace having openings in its opposite ends, supports for the billets, &c., extending through the furnace from the discharge to the receiving opening, the supports adjacent to the discharge-opening being sufficiently inclined to cause the automatic movement of the article past the fuel-ports through said opening, a fore-plate arranged at the front end of the furnace on or approximately on a level with the billet-supports, a truck movable into line with the fore-plate and having its bed or platform on or approximately on a level with the fore-plate, and mechanism for pushing the billets, &c., from the truck into and through the furnace, substantially as set forth.

10. A continuous-heating furnace having receiving and discharge openings at or near the ends of the furnace, and pipes or supports for the billets extending from the receiving or charging opening toward the discharge-opening, and provided with one or more cinder-pockets arranged adjacent to and below the rear ends of the pipes or billet-supports and extending below the latter, and openings through the side walls of the furnace into said pockets, thereby permitting of the removal of the cinder during the operation of the furnace, substantially as set forth.

11. A continuous-heating furnace having in combination continuous piers or supporting-walls extending longitudinally from the front toward the rear end of the furnace, pipes or billet-supports arranged on the longitudinal piers and extending beyond the ends of said piers toward the rear end of the furnace, thereby forming a cinder-pocket in the rear of the piers and below the pipes or supports, substantially as set forth.

In testimony whereof we have hereunto set our hands.

ALEXANDER LAUGHLIN.
JOSEF REULEAUX.

Witnesses:
DARWIN S. WOLCOTT,
F. E. GAITHER.